United States Patent [19]
Farina et al.

[11] Patent Number: 5,327,279
[45] Date of Patent: Jul. 5, 1994

[54] APPARATUS FOR LINEARIZATION OF OPTIC MODULATORS USING A FEED-FORWARD PREDISTORTION CIRCUIT

[75] Inventors: James D. Farina, Tolland; Gregory J. McBrien, Cromwell, both of Conn.

[73] Assignee: United Technologies Corporation, Hartford, Conn.

[21] Appl. No.: 916,233

[22] Filed: Jul. 17, 1992

[51] Int. Cl.$^5$ .................................... H04B 10/04
[52] U.S. Cl. ............................ 359/180; 359/188; 359/161; 332/160; 455/63; 375/60
[58] Field of Search ............... 375/60; 359/180, 181, 359/187, 188, 161; 332/160; 330/149; 455/50.1, 63, 114, 116, 303

[56] References Cited

U.S. PATENT DOCUMENTS

| | | | |
|---|---|---|---|
| 4,984,861 | 1/1991 | Suchoski, Jr. et al. | 350/96.11 |
| 4,992,754 | 2/1991 | Blauvelt et al. | 330/149 |
| 5,040,865 | 8/1991 | Chen et al. | 350/96.14 |
| 5,210,633 | 5/1993 | Trisno | 359/194 |

FOREIGN PATENT DOCUMENTS 0524758 1/1993 European Pat. Off. ............ 359/181

OTHER PUBLICATIONS

Donaldson, A. et al., "Linearity Considerations in High Performance Amplitude Modulators", *IEEE Colloquium on 'Analogue Optical Communications'*, Digest No. 156, Dec. 1989, pp. 4/1-5.

Lin, Ax-Q. et al., "Waveguide Modulators with Extended Linear Dynamic Range-a Theoretical Prediction", *IEEE Photonics Technology Letters*, vol. 2, No. 12, Dec. 1990, pp. 884-886.

Liu, P.-L. et al, "In Search of a Linear Electrooptic Amplitude Modulator", *IEEE Photonics Technology Letters*, vol. 3, No. 2, Feb. 1991, pp. 144-146.

Lin, A.-Q. et al, "Reduction of Intermodulation Distortion of Interferometric Optical Modulators Through Incoherent Mixing of Optical Waves", *Electronics Letters*, 1990, vol. 26, No. 23, pp. 1980-1982.

Childs, R. B. et al, "Predistortion Linearization of Directly Modulated DFB Lasers and External Modulators for AM Radio Transmission", *Technical Digest, Optical Fiber Communication Conf.*, Optical Society of America, Washl, D.C., 1990, paper WH-6.

Wu, Jingshown et al., "Linearization of Laser-Diode Nonlinearity of Broadband Analogue Fiber-Optic Communication", *International Journal of Optoelectronics*, 1988, vol. 3, No. 6, pp. 523-533.

Farwell, Mark et al., "An Electrooptic Intensity Modulator with Improved Linearity", *iEEE Photonics Technology Letters*, 1991, vol. 3, No. 9, pp. 792-795.

Suto, Ko-ichi, et al., "Intermodulation Distortion in 48 TV Channel FM-FDM Optical Transmission", *IEEE Photonics Technology Letters*, 1991, vol. 3, No. 9, pp. 844-846.

Zolotov, E. M., et al., "Integrated Optical Mach-Zehnder Modulator with a Linearized Modulation Characteristic", *Sov. J. Quantum Electron*, 18(3) 1988, pp. 401-402.

Bodeep, G. E. et al., "Comparision of Second-and Third- Order Distortion in Intensity Modulated InGaAsP Lasers and a LiNbO$_3$ External Modulator", OFC '89, paper WK-2.

DeRideer, R. M. et al., "Feedforward Compensation of Integrated Optic Modulator Distortion", paper WH-5.

Saleh, S. M. et al., "Compensation of Nonlinearity in Semiconductor Optical Amplifiers", *Electronics Letters*, 1988, vol. 24, No. 15, pp. 950-952.

*Primary Examiner*—Leslie Pascal

[57] ABSTRACT

A feed-forward predistortion circuit to provide improved linear response in optic modulators. The circuit includes a non-linear element, an amplifier/delay means and a power combiner. The non-linear element generates a first signal sin(X), where (X) is the input signal. The amplifier/delay means generates a second signal 2(X). The first and second signals are combined in the power combiner to produce a modulating signal 2(X)-sin(X) which is fed to an optic modulator. The modulating signal 2(X)-sin(X) compensates for the transfer function of the optic modulator which has a transfer function sin(X), thereby producing a linear output.

26 Claims, 3 Drawing Sheets

APPARATUS FOR LINEARIZATION OF OPTIC MODULATORS USING A FEED-FORWARD PREDISTORTION CIRCUIT

RELATED APPLICATION

The present application is related to commonly-owned, co-pending U.S. patent application Ser. No. 07/803,818, filed Dec. 9, 1991, now U.S. Pat. No. 5,168,534, issued on Dec. 1, 1992, entitled CASCADED OPTIC MODULATOR ARRANGEMENT.

TECHNICAL FIELD

This invention relates to optic modulators, and more particularly to a feed-forward predistortion circuit that provides improved linear response in optic modulators.

BACKGROUND ART

A trend in optical communication systems is to integrate functions traditionally performed by discrete optical components onto an integrated optic ("IO") device. These functions include polarizing, filtering, modulating, etc. One such IO device, having utility in the communications field, is operative to modulate an optical signal. Such an IO device is typically fabricated from a substrate of lithium niobate, $LiNbO_3$, or lithium tantalate, $LiTaO_3$, and has a waveguide formed on a major surface to provide parallel optic pathways. Examples of such a device, commonly referred to as an optic modulator, include a Mach-Zehnder modulator and a Balanced-Bridge interferometer.

A Mach-Zehnder includes input and output Y-junctions, parallel waveguide arms, and electro-optic modulators. An input optic signal such as a laser beam is split at the input Y-junction in the waveguide into two equal components. Each component travels in a corresponding arm of the waveguide before being recombined at the output Y-junction. To modulate the optic signals in the Mach-Zehnder, one or more electro-optic modulators comprising electrodes are formed on the waveguide surface in the vicinity of the arms. A time varying voltage, e.g., a radio frequency ("RF") signal, applied to the electrodes produces an electric field in the IO device substrate.

The basic operating principle of all optic modulators is the same. In accordance with the well-known electro-optic effect, an electrical field produced by an electrical input ("modulating") signal effectively changes the relative indices of refraction and thus changes the optic path lengths of the waveguide arms. Modulation of an optic input signal occurs since the relative phase of the optic signals in the arms varies according to the instantaneous amplitude of the time varying modulating signal driving the electrodes. The varying phase results in a varying amplitude of the intensity of the optic signal at the output of the modulator.

Since a modulator operates on light interference principles, its transfer function is a sine curve, i.e., $\sin(X)$. Consequently, a modulator generates undesirable harmonics when driven by a modulating signal such as an RF signal. When the modulator is driven symmetrically about the optical half intensity point of the sine curve, i.e., the approximately linear region of the curve, fundamental and odd harmonics predominate in the modulator's output. The amplitudes of the higher harmonics increase as the modulating voltage is increased. Thus, the modulator's output deviates noticeably from that which would be obtained with a perfectly linear device. See Donaldson, A. et al., "Linearity Considerations in High Performance Amplitude Modulators", *IEEE Colloquium on 'Analogue Optical Communications'*, Digest No. 156, pp. 4/1-5, December 1989.

Such harmonic intermodulation distortion due to odd harmonics is a problem in a multichannel optical communication system, e.g., cable television ("CATV"), where an RF signal is used to modulate an optical signal. A CATV system may have 80 channels multiplexed for transmission in a frequency range of 50–600 MHz. The large number of closely spaced carriers places strict requirements on the linearity of system elements in order to reduce undesired harmonic intermodulation distortion.

Typical amplitude modulation ("AM") transmission requirements for second and third order harmonics are −65 dBc relative to the fundamental. The inherent sine response of an optic modulator does not provide the requisite linearity. One means of lessening the effect of harmonic intermodulation distortion is to decrease the carrier modulation depth, known as the optical modulation index ("OMI"). However, this is an inefficient use of the optical power. This reduction in OMI has been taught by Donaldson. Attempts at linearizing the modulator's response have been made so as to reduce the amplitude of the higher order distortions. Such restriction reduces the transmitted signal strength. Thus, to improve the signal to noise ratio it is necessary to increase the transmitted optic power, which requires a more expensive optic source.

It is known in the art to use directional couplers, alone or in combination with Mach-Zehnders, to reduce harmonic intermodulation distortion. Such schemes employ exponential or other trigonometric terms to reduce the second and third order terms. See Lin, Z. -Q. et al., "Waveguide Modulators with Extended Linear Dynamic Range—A Theoretical Prediction", *IEEE Photonics Technology Letters*, Vol. 2, No. 12, pp. 884–886, December 1990; Liu, P. -L. et al., "In Search of a Linear Electrooptic Amplitude Modulator", *IEEE Photonics Technology Letters*, Vol. 3, No. 2, pp. 144–146, February 1991. However, creating a parallel optic structure requires complex phase and amplitude adjustment schemes. Further, coherent addition of correction terms requires the difficult task of maintaining the optic phase alignment of one or more parallel branches.

Optic linearization schemes are known in which two parallel Mach-Zehnders achieve incoherent combination of light intensities. See, e.g. Lin, Z. -Q. et al., "Reduction of Intermodulation Distortion of Interferometric Optical Modulators Through Incoherent Mixing of Optical Waves", *Electronics Letters*, 1990, Vol. 26, No. 23, pp. 1980–1982. However, such a scheme may be limited to a narrow frequency range and a small optic signal transmission distance due to wavelength dispersion of the transmitted optic signal.

Commonly-owned, co-pending U.S. patent application Ser. No. 07/803,818, filed Dec. 9, 1991, now U.S. Pat. No. 5,168,534 entitled CASCADE OPTIC MODULATOR ARRANGEMENT discloses a cascade linearization circuit to reduce harmonic intermodulation distortion. In the cascade circuit, two optic modulators, such as Mach-Zehnders, are connected in series. A signal fed to the optic input of the first Mach-Zehnder is modulated by an electro-optic modulator. The resulting modulated optic signal is fed to the optic input of a second Mach-Zehnder and is modulated by the electro-optic modulator of the second Mach-Zehnder. The phase offset of both modulators, and the contrast of one modulator, are adjusted to minimize both second and third order harmonics. However, the cascade arrangement requires phase and gain accuracy to be tightly constrained. Further, the arrangement is costly because two modulators are required.

It is also known in the art to use predistortion to compensate for the optic modulator's non-linear transfer function. Predistortion refers to a technique of distorting a modulating signal equally in phase but opposite in amplitude to the transfer function of the optic modulator before feeding the modulating signal to the optic modulator. Thus, the predistortion effectively cancels the distortion inherent to the optic modulator. Prior art predistortion circuits employ a simple diode network to directly approximate the transfer function arcsin(X). Arcsin(X) is used since the transfer function of the optic modulator is sin(X), i.e., sin[arcsin(X)]=X. However, such prior art systems have severe limitations. Such systems drift and operate over relatively narrow bandwidth. Further, high impedance and current biasing sources are needed.

DISCLOSURE OF INVENTION

An aspect of the present invention is to provide a predistortion circuit which operates over a relatively wide bandwidth without substantial drift.

Another aspect of the present invention is to provide a versatile predistortion circuit having a transfer function of arcsin(X).

Another aspect of the present invention is to provide a reduction in amplitude of the third order harmonics inherently generated by optic modulators.

According to the present invention, a predistortion circuit for a non-linear element with a transfer function G(X) comprises a non-linear element with transfer function H(X), which is an approximation of G(X), and a linear element with a transfer function A*X which are combined to form (A*X)—H(X) such that G((A*X)—H(X)) is approximately equal to X. In further accord with the present invention, the desired predistortion transfer function, arcsin(X), is approximated by generating a first signal sin(X) and a second signal 2(X) from an input signal (X) and combining those signals to generate 2(X)-sin(X) which is approximately arcsin(X).

The invention is predicated on the fact that the inversion of the linear term in the transfer function of a sinusoidal modulator can be used to approximate an arcsine function. That is, an optic modulator or similar sine response circuit can be employed in combination with other readily available hardware as a predistortion circuit for another optic modulator.

The predistortion circuit of the present invention is quite capable of meeting the specifications presently demanded by the CATV industry. Composite triple beat ("CTB") is a measurement of the worst case sum of third order distortion products produced over the entire video band. Typically, AM video transmission systems require a CTB of —65 dBc. The present invention yields —67 dBc operating on a CATV band up to 1 GHz with channels at 6 MHz intervals.

The present invention has significant advantages over prior art predistortion systems. Prior art systems have a limited operating range due to hardware constraints. The present invention can operate over a range of 1 MHz to 1 GHz with hardware that is readily available.

The fact that the hardware needed to implement the present invention is readily available also makes the present invention less costly to build than prior art systems.

These and other aspect, features and advantages of the present invention will become more apparent in light of the detailed description of a best mode embodiment thereof, as illustrated in the accompanying drawing.

BEST MODE FOR CARRYING OUT THE INVENTION

The versatility of a predistortion circuit is dependant on both the technique used and the operating limitations of the electronic components which implement the technique. Improving components is very costly. Thus, the key to a versatile predistortion circuit is a technique which will not be limited by operating limitations of standard components. Since operating the optic modulator at the optical half intensity point of the sin curve will essentially eliminate the second order products, the primary concern is the third order products. Therefore, the requirements on the transfer function of the predistortion circuit can be relaxed to the point where it can approximate arcsin(X) to only the third order with negligible higher order terms. Examination of the Taylor expansion series for the sin function, $$\sin(X) = X - \frac{X^3}{3!} + \ldots + (-1)^n \frac{X^{(2n-1)}}{(2n-1)!} \qquad \text{[Eq. 1]}$$

and the arcsin function, $$\arcsin(X) = X + \frac{X^3}{3!} + \frac{3x^5}{40} + \frac{1*3*5*X^7}{2*4*6*7} + \ldots \qquad \text{[Eq. 2]}$$

indicates that the only difference to the third order is the sign of the third order term. If the sin function is inverted and added to two times the argument (X), the result of the third order is approximately equal to arcsin.

$$2(X) - \sin(X) \approx X + \frac{X^3}{3!} \qquad \text{[Eq. 3]}$$

Therefore, a signal processed by the predistortion transfer characteristic of Eq. 3 and subsequently fed into a Mach-Zehnder modulator will result in negligible third order distortion because of the close approximation to arcsin. In fact, almost any device that, like an optic modulator, exhibits a sinusoidal response can be corrected by another device with identical response whose higher order terms have their signs inverted by this unique method. Given a non-linear element with a transfer function G(X), a predistortion circuit for that element would include a non-linear element with a transfer function H(X), which is an approximation of G(X), and a linear element with a transfer function A*X which are combined to form (A*X)−H(X) such that G((A*X)−H(X)) is approximately equal to X.

Figure 1:
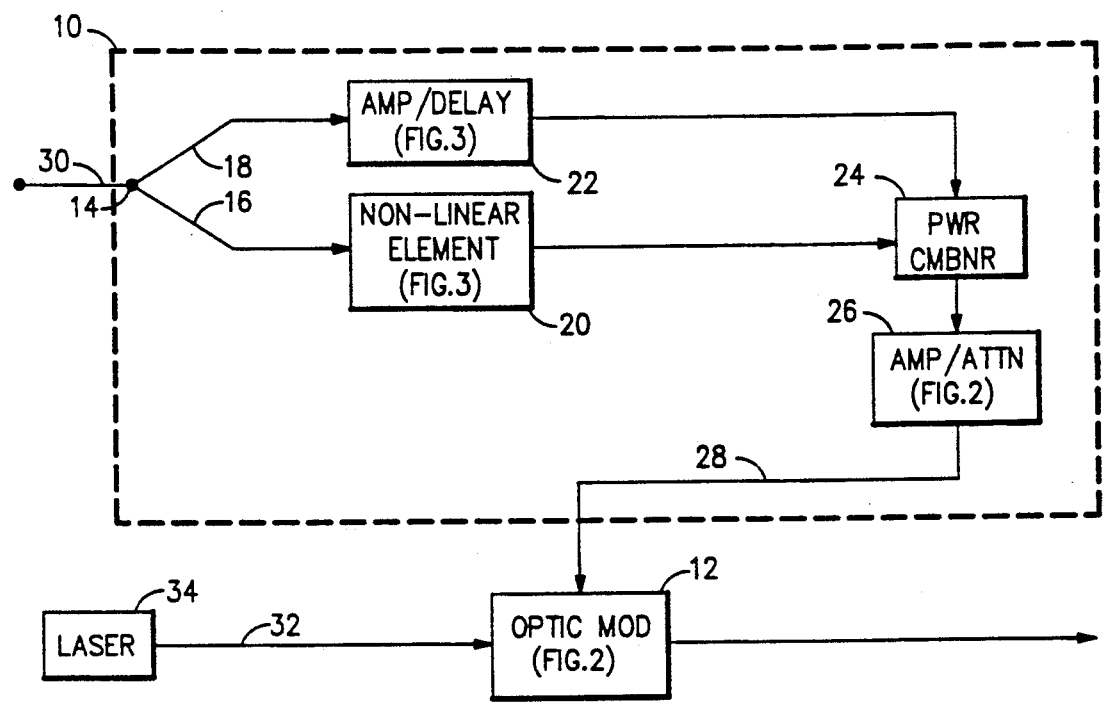
FIG. 1 is a block diagram of a feed-forward predistortion circuit connected to an optic modulator in accordance with the present invention.

FIG. 1 is a block diagram of a feed-forward predistortion circuit 10 connected to an optic modulator 12. The predistortion circuit 10 includes an input Y-junction 14, a pair of branches 16, 18, a non-linear element 20, an amplifier/delay means 22, a power combiner 24, an amplifier/attenuator means 26, and an output line 28. An electromagnetic input signal (FIG. 4(a)) is fed along a waveguide 30. The input signal is split into two equal signals (FIG. 4(a)) at the Y-junction 14 and is fed to the two branches 16, 18. The signal in branch 16 is fed to the non-linear element 20. The non-linear element 20 has a transfer function of −sin(X). Thus, a signal (FIG. 4(b)) at the output of the non-linear element 20 has the waveform −sin(X).

Figure 4A:
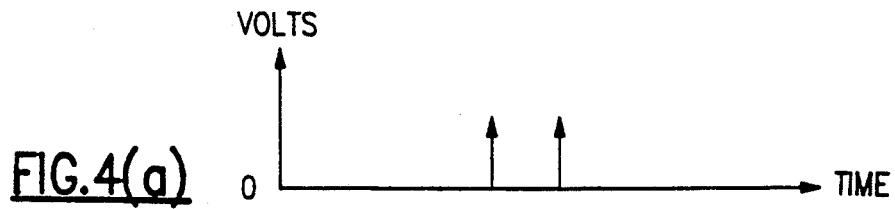
FIGS. 4a–4g are diagrams of signals which exist at significant nodes of FIG. 1 and FIG. 2.
Figure 4B:
Figure 4C:
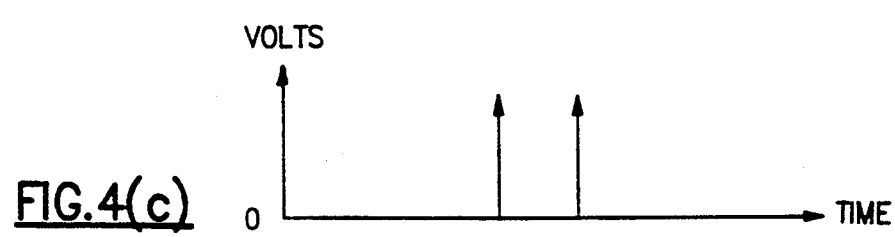
Figure 4D:
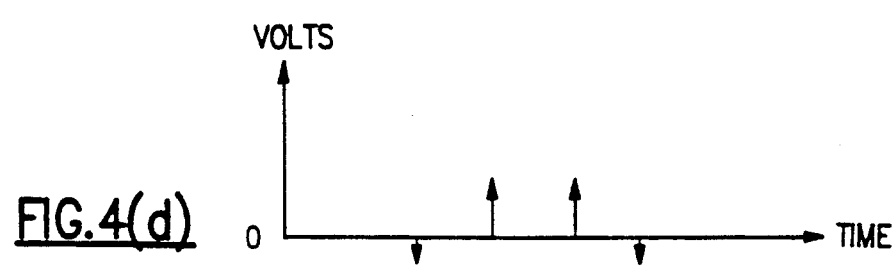
Figure 4E:
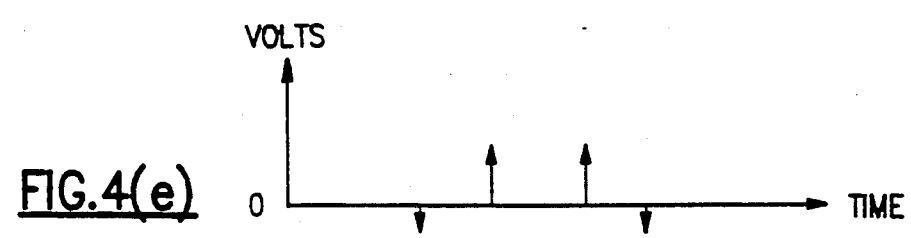

The signal (FIG. 4(a)) in branch 18 is fed to the amplifier/delay means 22 which doubles the amplitude of the signal (FIG. 4(a)) and substantially matches a delay (not illustrated) inherently caused by the non-linear element 20. Thus, a signal (FIG. 4(c)) at the output of the amplifier/delay means 22 has the waveform 2(X). This signal (FIG. 4(c)) is combined in the power combiner 24 with the signal (FIG. 4(b)) at the output of the non-linear element 20. Thus, a signal (FIG. 4(d)) at the output of the power combiner 24 has the waveform [2(X)−sin(X)]. This signal (FIG. 4(d)) is fed to the amplifier/attenuator means 26, which provides a modulating signal (FIG. 4(e)) at the output line 28 of the predistortion circuit. The amplifier/attenuator means 26 is adjusted in such a manner that the signal power of the input signal (FIG. 4(a)) of the predistortion circuit is substantially equal to the signal power of the modulating signal (FIG. 4(e)).

Figure 4F:
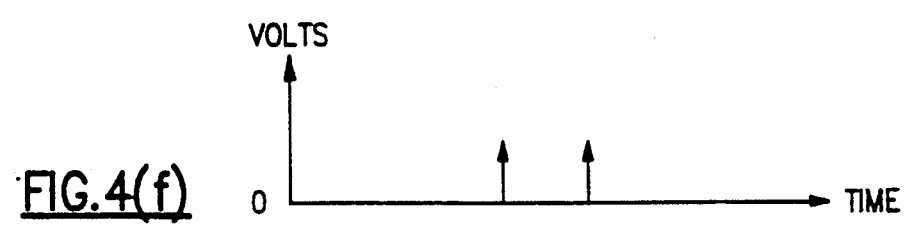

The optic modulator 12 is operative to introduce a phase shift in a laser beam 32 coming from a laser 34. The phase shift is in an amount corresponding to the instantaneous voltage of the modulating signal (FIG. 4(e)) of the predistortion circuit. The optic modulator has a transfer function of sin(X), where (X) represents the modulating signal (FIG. 4(e)) of the predistortion circuit which is applied to the optic modulator. As described hereinbefore, the predistortion circuit has a transfer function that provides the modulating signal with the waveform [2(X)−sin(X)]. Consequently, the predistortion circuit compensates for the transfer function of the optic modulator 12 to produce a linear output signal (FIG. 4(f)) at the output of the optic modulator having the waveform (X), i.e., sin[2(X)−sin(X)]=X.

The amplifier/attenuator means 26 coordinates the predistortion circuit 10 for proper operation. The amplifier/attenuator means ensures that the signal power of the modulating signal (FIG. 4(e)) applied to the optic modulator is substantially equal to the signal power of the input signal (FIG. 4(a)) of the predistortion circuit. If the signal power of the input signal of the predistortion circuit were greater than the signal power the modulating signal, the transfer characteristic of the predistortion circuit would flatten out relative to the transfer characteristic of the optic modulator, thereby producing a non-linear output (not illustrated). The power levels generally need not be adjusted once set.

Figure 2:
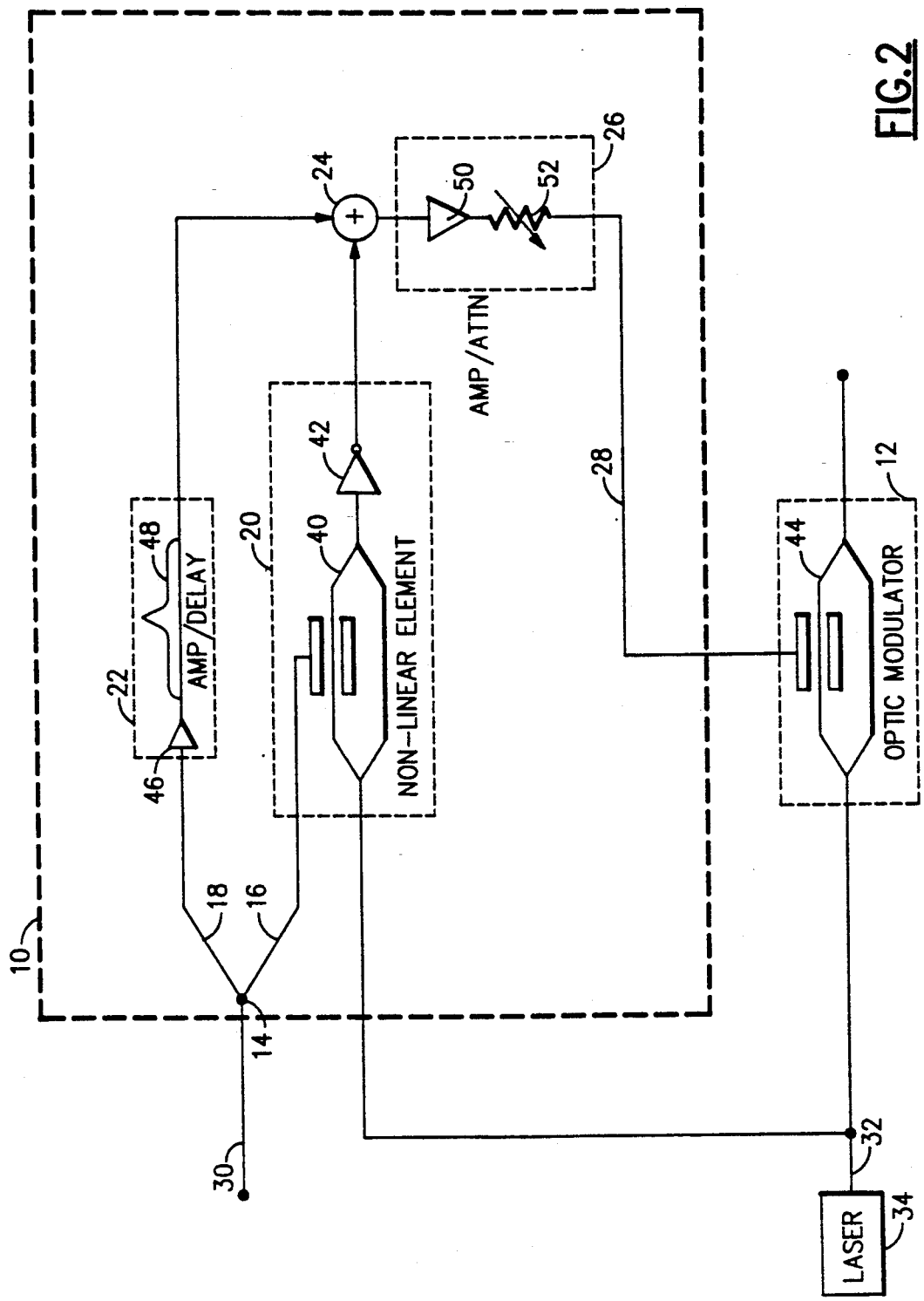
FIG. 2 is a diagram of the feed-forward predistortion circuit of FIG. 1 utilizing a Mach-Zehnder modulator and an inverter that in combination function as the non-linear element of FIG. 1.
Figure 4G:
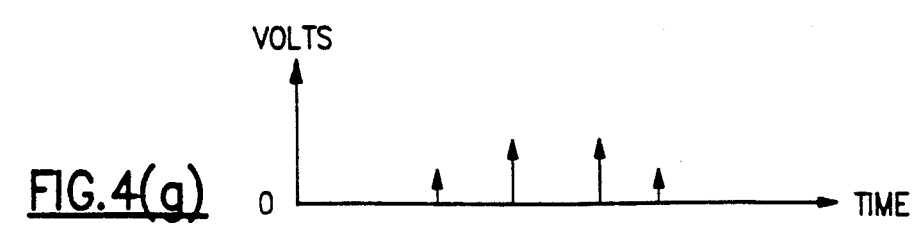

FIG. 2 is a schematic diagram of the feed-forward predistortion circuit 10 of FIG. 1 utilizing a Mach-Zehnder modulator 40 and an inverter 42 that in combination function as the non-linear element 20 of FIG. 1. The laser beam 32 coming from the laser 34 is split and fed to the optic modulator 12 and the Mach-Zehnder modulator 40 in the non-linear element 20. The optic modulator 12 is also a Mach-Zehnder 44. The electromagnetic input signal (FIG. 4(a)) having the waveform (X) is applied to the waveguide 30 of the predistortion circuit 10. A signal (FIG. 4(g)) having the waveform sin(X) is produced by the Mach-Zehnder modulator 40 in the non-linear element 20. This signal (FIG. 4(g)) becomes the signal (FIG. 4(b)) having the waveform [−sin(X)] after passing through the inverter 42. The signal (FIG. 4(c)) having the waveform 2(X) is produced using an amplifier 46 and a length of cable 48 that in combination function as the amplifier/delay means 22. The two signals (FIG. 4(b, c)) are combined to produce the signal (FIG. 4(d)) having the waveform arcsin(X) in the power combiner 24, i.e., 2(X)−sin(X)=arcsin(X). The signal power of the modulating signal (FIG. 4(e)) is adjusted to match the signal power of the input signal (FIG. 4(a)) by an amplifier 50 and an attenuator 52 that function in combination as the amplifier/attenuator means 26. Since the transfer function of the optic modulator 12 is sin(X), the output signal (FIG. 4(f)) of the optic modulator is linear, i.e., sin[2(X)−sin(X)]=X.

Figure 3:
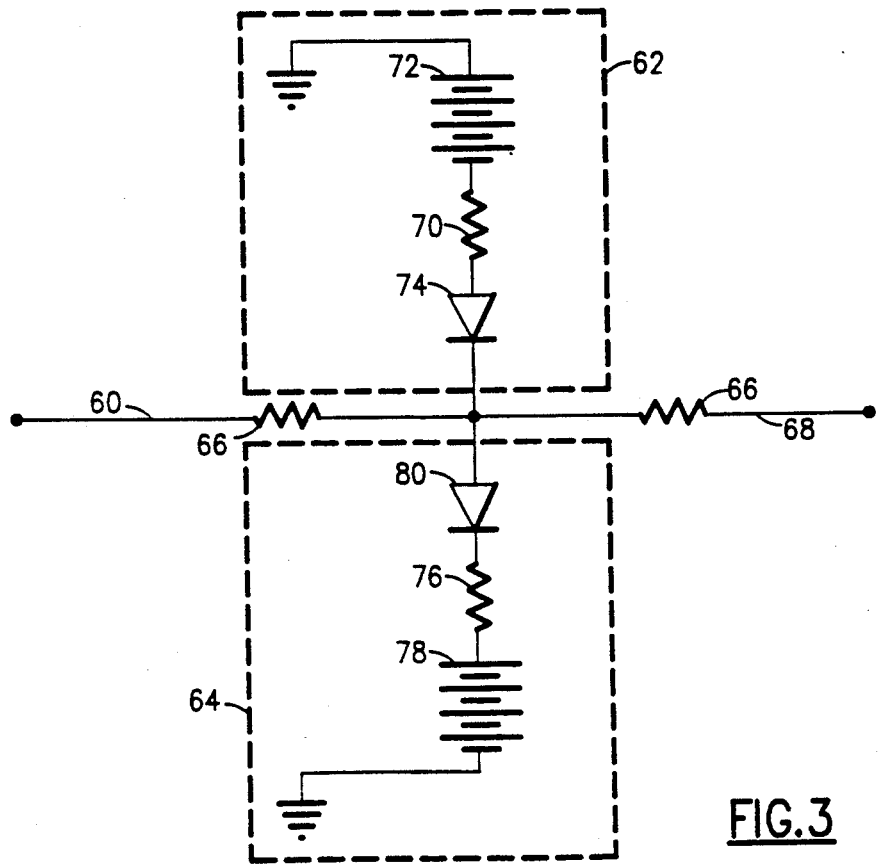
FIG. 3 is a schematic diagram of a diode network which functions as an alternative to the Mach-Zehnder modulator in the non-linear element of FIG. 2.

FIG. 3 is a schematic diagram of a diode network which functions as an alternative to the Mach-Zehnder modulator 40 in the non-linear element 20 of FIG. 2. The network consists of an input line 60, a positive reference branch 62, a negative reference branch 64, two current limiting resistors 66, and an output line 68. The positive reference branch 62 includes a resistor 70, a positive reference voltage 72, and an associated diode 74. The negative reference branch 64 includes a resistor 76, a negative reference voltage 78, and an associated diode 80. Both diodes 74, 80 are similarly biased. As long as the input line 60 voltage is lower in magnitude than the positive reference voltage 72 and higher than the negative reference voltage 78, neither of the diodes 74, 80 will conduct. Thus, the output line 68 voltage will follow the input line 60 voltage. As the input line 60 voltage rises above the positive reference voltage 72, the diode 74 in the positive reference branch 62 will begin to conduct and the output line 68 voltage will follow the input line 60 voltage with a reduced slope. This reduction in the slope will increase as the current passing through the diode 74 increases. The result is a bend in the waveform of the output line 68 voltage. This bending approximates the first quarter cycle of the sin(X) function. As the input line 60 voltage decreases, the slope of the output line 68 voltage will increase; eventually following the input line 60 voltage as the input line 60 voltage falls below the positive reference voltage 72 and the diode 74 ceases to conduct. Thus, the positive reference branch 62 provides the first half cycle of the sin(X) function. When the input line 60 voltage goes negative, the same process takes place with respect to the negative reference voltage 78. Thus, the negative reference branch 64 provides the second half cycle of the sin(X) function and the transfer function of the network is sin(X). The network has the advantage of being a less costly alternative than the Mach-Zehnder modulator 40 of FIG. 2.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention. For example although we have shown the non-linear element 20 and the optic modulator 12 with a transfer function sin(X), the present invention will operate with any elements that have a transfer function whose Taylor series expansion yields a first term (X).

What is claimed is:

1. A predistortion circuit for linearizing an optic modulator, said predistortion circuit being operative in response to an input signal (X), comprising:
   means for providing a first signal(X);
   means for providing a second signal 2(X); and
   means for combining said first and second signals to provide a modulating signal 2(X)−sin(X), such that the optic modulator receiving said modulating signal generates a linear output signal(X).

2. The circuit of claim 1, wherein said means for providing said first signal comprises an optic modulator.

3. The circuit of claim 2, wherein said optic modulator comprises a Mach-Zehnder modulator.

4. The circuit of claim 1, wherein said means for providing said first signal comprises:
   an input line having an input voltage;
   a positive reference branch;
   a negative reference branch;
   an output line having an output voltage; and
   wherein said positive reference branch comprises a positive reference voltage and a first diode, and said negative reference branch comprises a negative reference voltage and a second diode, said positive and negative reference branches being connected to a single node between said input line and said output line, said diodes being similarly biased such that said output voltage follows said input voltage when said diodes are not conducting, and said output voltage bends when said diodes are conducting, thereby producing said first signal.

5. The circuit of claim 1, wherein said means for providing said second signal comprises an amplifier.

6. The circuit of claim 1, wherein said means for combining said first signal and said second signal to provide said modulating signal comprises a power combiner.

7. A circuit for modulating an optic signal, said circuit being operative in response to an input signal(X), comprising:
   means for providing a first signal having a waveform sin(X);
   means for providing a second signal having a waveform 2(X);
   means for combining said first and second signals to provide a modulating signal having a waveform 2(X)−sin(X); and
   means for modulating the optic signal with said modulating signal, said means for modulating having a transfer function sin(X), such that the optic signal is modulated to produce a linear output signal(X).

8. The circuit of claim 7, wherein said means for providing said first signal comprises an optic modulator.

9. The circuit of claim 8, wherein said optic modulator comprises a Mach-Zehnder modulator.

10. The circuit of claim 7, wherein said means for providing said first signal comprises:
    an input line having an input voltage;
    a positive reference branch;
    a negative reference branch;
    an output line having an output voltage and
    wherein said positive reference branch comprises a positive reference voltage and a first diode, said negative reference branch comprises a negative reference voltage and a second diode, said positive and negative reference branches being connected to a single node between said input line and said output line, said diodes being similarly biased such that said output voltage follows said input voltage when said diodes are not conducting, and said output voltage bends when said diodes conduct, thereby producing said first signal.

11. The circuit of claim 7, wherein said means for providing said second signal comprises an amplifier.

12. The circuit of claim 7, wherein said means for combining said first signal and said second signal to provide said modulating signal comprises a power combiner.

13. The circuit of claim 7, wherein said means for modulating the optic signal with said modulating signal comprises an optic modulator.

14. The circuit of claim 13, wherein said optic modulator comprises a Mach-Zehnder modulator.

15. An optical modulating system having a linearized transfer function comprising:
    an optical modulator for receiving a light source input and a modulating input for modulating said light source input, said optical modulator comprising a non-linear transfer function; and
    a predistortion system for linearizing said non-linear transfer function of said optical modulator, said predistortion system comprising:
       a non-linear element for receiving an input signal(X) and for responding with an output signal H(X), said input signal(X) having a signal power;
       means for providing an output signal (A*X) in response to said input signal(X).
       means for combining said output signal H(X) of said non-linear element with said output signal (A*X), said means for combining generating an output signal, (A*X)−H(X), having a signal power; and
       means for matching said signal power of said input signal (X) with said signal power of said output signal, (A*X)−H(X), of said means for combining such that said signal power are substantially equal, said means for matching generating an output signal received by said optical modulator as said modulating input, thereby linearizing said non-linear transfer function of said optical modulator.

16. The optical modulating system of claim 15, wherein said output signal, H(X), of said non-linear element is sin(X).

17. The optical modulating system of claim 15, wherein said output signal, (A*X), of said means for providing an output signal (A*X) in response to said input signal(X) is (2*X).

18. The optical modulating system of claim 15, wherein said output signal, H(X), of said non-linear element comprises a Taylor series expansion yielding a first term(X).

19. The optical modulating system of claim 15, wherein said non-linear element comprises an optic modulator.

20. The optical modulating system of claim 19, wherein said optic modulator comprises a Mach-Zehnder modulator.

21. The optical modulating system of claim 15, wherein said non-linear element comprises:
   an input line having an input voltage;
   an output line having an output voltage;
   a positive reference branch comprising:
      a positive reference voltage; and
      a first diode;
   a negative reference branch comprising:
      a negative reference voltage; and
      a second diode; and
   wherein said positive and said negative reference branches are connected to a single node between said input line and said output line, and said first and second diodes are similarly biased, such that said output voltage follows said input voltage when said diodes are not conducting, and said output voltage bends when said diodes conduct, thereby producing said output signal H(X).

22. The optical modulating system of claim 15, wherein said means for providing an output signal (A*X) comprises an amplifier.

23. The optical modulating system of claim 15, wherein said means for matching said signal power comprises an attenuator.

24. The optical modulating system of claim 15, wherein said means for matching said signal power comprises an amplifier.

25. The optical modulating system of claim 15, wherein said output signal, H(X), of said non-linear element comprises a delay, and said means for providing an output signal (A*X) comprises:
   a delay; and
   means for matching said delay of said means for providing an output signal (A*X) with said delay of said output signal, H(X), of said non-linear element.

26. The optical modulating system of claim 25, wherein said means for matching said delay comprises an amplifier and a cable having a predetermined length.

* * * * *